(12) United States Patent
Venkatesan et al.

(10) Patent No.: US 9,407,533 B2
(45) Date of Patent: Aug. 2, 2016

(54) MULTICAST IN A TRILL NETWORK

(75) Inventors: Nagarajan Venkatesan, San Jose, CA (US); Anoop Ghanwani, Rocklin, CA (US); Shunjia Yu, San Jose, CA (US); Phanidhar Koganti, Sunnyvale, CA (US); Rajiv Krishnamurthy, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 412 days.

(21) Appl. No.: 13/351,513

(22) Filed: Jan. 17, 2012

(65) Prior Publication Data

US 2013/0003733 A1  Jan. 3, 2013

Related U.S. Application Data

(60) Provisional application No. 61/502,143, filed on Jun. 28, 2011.

(51) Int. Cl.
| | | |
|---|---|---|
| *H04L 12/761* | (2013.01) | |
| *H04L 12/46* | (2006.01) | |
| *H04L 12/721* | (2013.01) | |
| *H04L 12/18* | (2006.01) | |

(52) U.S. Cl.
CPC ............ *H04L 45/16* (2013.01); *H04L 12/1881* (2013.01); *H04L 12/4625* (2013.01); *H04L 12/4641* (2013.01); *H04L 45/66* (2013.01)

(58) Field of Classification Search
None
See application file for complete search history.

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,959,968 A | 9/1999 | Chin |
| 5,973,278 A | 10/1999 | Wehrli, III et al. |
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,438,106 B1 | 8/2002 | Pillar |
| 6,542,266 B1 | 4/2003 | Phillips |

(Continued)

FOREIGN PATENT DOCUMENTS

| | | |
|---|---|---|
| EP | 1398920 A2 | 3/2004 |
| EP | 1916807 A2 | 4/2008 |
| EP | 2001167 A1 | 12/2008 |
| WO | 2009042919 | 4/2009 |
| WO | 2010111142 A1 | 9/2010 |

OTHER PUBLICATIONS

M. Christensen, et al., "Considerations for Internet Group Management Protocol (IGMP) and Multicast Listener Discovery (MLD) Snooping Switches", Network Working Group, May 2006.

(Continued)

*Primary Examiner* — Ayaz Sheikh
*Assistant Examiner* — Peter Chau
(74) *Attorney, Agent, or Firm* — Shun Yao; Park, Vaughan, Fleming & Dowler LLP

(57) ABSTRACT

One embodiment of the present invention provides a switch. A switch includes a storage and a multicast management mechanism. The storage is configured to store an entry indicating a multicast group membership learned at a remote switch. The multicast management mechanism is coupled to the storage and is configured to suppress flooding of packets destined for the multicast group.

24 Claims, 13 Drawing Sheets

(56) References Cited

U.S. PATENT DOCUMENTS

| | | |
|---|---|---|
| 6,633,761 B1 | 10/2003 | Singhal |
| 6,873,602 B1 | 3/2005 | Ambe |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homechaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | J Ha |
| 8,599,864 B2 | 12/2013 | Chung |
| 8,615,008 B2 | 12/2013 | Natarajan |
| 2001/0055274 A1 | 12/2001 | Hegge |
| 2002/0019904 A1 | 2/2002 | Katz |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2004/0001433 A1 | 1/2004 | Gram |
| 2004/0010600 A1 | 1/2004 | Baldwin |
| 2004/0049699 A1 | 3/2004 | Griffith |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0213232 A1 | 10/2004 | Regan |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie |
| 2005/0157751 A1 | 7/2005 | Rabie |
| 2005/0169188 A1 | 8/2005 | Cometto |
| 2005/0195813 A1 | 9/2005 | Ambe |
| 2005/0213561 A1 | 9/2005 | Yao |
| 2005/0265356 A1 | 12/2005 | Kawarai |
| 2005/0278565 A1 | 12/2005 | Frattura |
| 2006/0018302 A1 | 1/2006 | Ivaldi |
| 2006/0023707 A1 | 2/2006 | Makishima et al. |
| 2006/0034292 A1 | 2/2006 | Wakayama |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0168109 A1 | 7/2006 | Warmenhoven |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2007/0036178 A1 | 2/2007 | Hares |
| 2007/0086362 A1 | 4/2007 | Kato |
| 2007/0094464 A1 | 4/2007 | Sharma |
| 2007/0097968 A1 | 5/2007 | Du |
| 2007/0116224 A1 | 5/2007 | Burke |
| 2007/0177597 A1 | 8/2007 | Ju |
| 2007/0183313 A1 | 8/2007 | Narayanan |
| 2007/0211712 A1 | 9/2007 | Fitch |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |

(56) References Cited

U.S. PATENT DOCUMENTS

| | | |
|---|---|---|
| 2008/0267179 A1 | 10/2008 | LaVigne |
| 2008/0285555 A1 | 11/2008 | Ogasahara |
| 2008/0298248 A1 | 12/2008 | Roeck |
| 2008/0310342 A1 | 12/2008 | Kruys |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138752 A1 | 5/2009 | Graham |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0054246 A1* | 3/2010 | Shah et al. ............... 370/390 |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukia |
| 2010/0165995 A1 | 7/2010 | Mehta |
| 2010/0168467 A1 | 7/2010 | Johnston |
| 2010/0169467 A1 | 7/2010 | Shukia |
| 2010/0169948 A1 | 7/2010 | Budko |
| 2010/0182920 A1 | 7/2010 | Matsuoka |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | McDysan |
| 2011/0161695 A1 | 6/2011 | Okita |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0273988 A1 | 11/2011 | Tourrilhes |
| 2011/0274114 A1 | 11/2011 | Dhar |
| 2011/0286457 A1 | 11/2011 | Ee |
| 2011/0296052 A1 | 12/2011 | Guo |
| 2011/0299391 A1 | 12/2011 | Vobbilisetty |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033669 A1 | 2/2012 | Mohandas |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0163164 A1 | 6/2012 | Terry |
| 2012/0177039 A1 | 7/2012 | Berman |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320800 A1* | 12/2012 | Kamble et al. ............... 370/255 |
| 2012/0320926 A1 | 12/2012 | Kamath et al. |
| 2012/0327937 A1 | 12/2012 | Melman et al. |
| 2013/0028072 A1 | 1/2013 | Addanki |
| 2013/0034015 A1 | 2/2013 | Jaiswal |
| 2013/0067466 A1 | 3/2013 | Combs |
| 2013/0127848 A1 | 5/2013 | Joshi |
| 2013/0194914 A1 | 8/2013 | Agarwal |
| 2013/0250951 A1 | 9/2013 | Koganti |
| 2013/0259037 A1 | 10/2013 | Natarajan |
| 2013/0272135 A1 | 10/2013 | Leong |
| 2014/0105034 A1 | 4/2014 | Sun |

OTHER PUBLICATIONS

"Switched Virtual Internetworking moves beyond bridges and routers", Sep. 23, 1994, No. 12, New York, US.

Knight, S. et al. "Virtual Router Redundancy Protocol", Apr. 1998, XP-002135272.

Eastlake, Donald et al., "RBridges: TRILL Header Options", Dec. 2009.

(56) References Cited

OTHER PUBLICATIONS

Touch, J. et al., "Transparent Interconnection of Lots of Links (TRILL): Problem and Applicability Statement", May 2009.
Perlman, Radia et al., "RBridge VLAN Mapping", Dec. 2009.
"Brocade Fabric OS (FOS) 6.2 Virtual Fabrics Feature Frequently Asked Questions", Jan. 2009.
Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", Mar. 2010.
"Switched Virtual Internetworking moved beyond bridges and routers", 8178 Data Communications Sep. 23, 1994, No. 12, New York.
S. Night et al., "Virtual Router Redundancy Protocol", Network Working Group, XP-002135272, Apr. 1998.
Eastlake 3rd., Donald et al., "RBridges: TRILL Header Options", Draft-ietf-trill-rbridge-options-00.txt, Dec. 24, 2009.
J. Touch, et al., "Transparent Interconnection of Lots of Links (TRILL): Problem and Applicability Statement", May 2009.
Perlman, Radia et al., "RBridge VLAN Mapping", Draft-ietf-trill-rbridge-vlan-mapping-01.txt, Dec. 4, 2009.
Brocade Fabric OS (FOS) 6.2 Virtual Fabrics Feature Frequently Asked Questions, Jan. 2009.
Perlman, Radia et al., "RBridges: Base Protocol Specification", draft-ietf-trill-rbridge-protocol-16.txt, Mar. 3, 2010.
Christensen, M. et al., "Considerations for Internet Group Management Protocol (IGMP) and Multicast Listener Discovery (MLD) Snooping Switches", May 2006.
Lapuh, Roger et al., "Split Multi-link Trunking (SMLT)", Oct. 2002.
Lapuh, Roger et al., "Split Multi-link Trunking (SMLT) draft-lapuh-network-smlt-08", 2008.
Office action dated Aug. 29, 2014, U.S. Appl. No. 13/042,259, filed Mar. 7, 2011.
Office Action dated Mar. 14, 2014, U.S. Appl. No. 13/092,460, filed Apr. 22, 2011.
Office action dated Aug. 21, 2014, U.S. Appl. No. 13/184,526, filed Jul. 16, 2011.
Office Action dated Mar. 6, 2014, U.S. Appl. No. 13/425,238, filed Mar. 20, 2012.
Office Action dated Feb. 28, 2014, U.S. Appl. No. 13/351,513, filed Jan. 17, 2012.
BROCADE, 'Fastlron and Turbolron 24x Configuration Guide', Feb. 16, 2010.
BROCADE, 'The Effortless Network: Hyperedge Technology for the Campus LAN' 2012.
Brocade 'An Introduction to Brocade VCS Fabric Technology', Dec. 3, 2012.
Fastlron Configuration Guide Supporting Ironware Software Release 07.0.00, Dec. 18, 2009.
Foundary Fastlron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Piscataway, US, vol. 42, No. 6, Jun. 1, 2004 pp. 124-131, XP001198207, ISSN: 0163-6804, DOI: 10.1109/MCOM.2004.1304248.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over I ay-problem -statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.

(56) References Cited

OTHER PUBLICATIONS

Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/533,843, filed Jun. 26, 2012, dated Oct. 21, 2013.
Office Action for U.S. Appl. No. 13/598,204, filed Aug. 29, 2012, dated Feb. 20, 2014.
Office Action dated Apr. 9, 2014, U.S. Appl. No. 13/092,724, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Office Action dated Jun. 18, 2014, U.S. Appl. No. 13/440,861, filed Apr. 5, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Huang, Nen-Fu et al., 'An Effective Spanning Tree Algorithm for a Bridged LAN', Mar. 16, 1992.
Office Action for U.S. Appl. No. 13/098,490, filed May 2, 2011, dated Mar. 27, 2014.
Zhai F. Hu et al. 'RBridge: Pseudo-Nickname; draft-hu-trill-pseudonode-nickname-02.txt', May 15, 2012.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jan. 6, 2014, U.S. Appl. No. 13/092,877, filed Apr. 22, 2011.
Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office action dated Nov. 12, 2013, U.S. Appl. No. 13/312,903, filed Dec. 6, 2011.
BROCADE 'Brocade Unveils'The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Office Action for U.S. Appl. No. 13/365,808, filed Jul. 18, 2013, dated Jul. 18, 2013.
Office Action for U.S. Appl. No. 13/092,887, dated Jan. 6, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.

(56) References Cited

OTHER PUBLICATIONS

Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.

* cited by examiner

MULTICAST IN A TRILL NETWORK

RELATED APPLICATIONS

This application claims the benefit of U.S. Provisional Application No. 61/502,143, titled "IGMP Snooping in VCS Cluster," by inventors Nagarajan Venkatesan, Anoop Ghanwani, Shunjia Yu, Phanidhar Koganti, and Rajiv Krishnamurthy, filed 29 Jun. 2011, which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and to U.S. patent application Ser. No. 13/092,752, titled "Name Services for Virtual Cluster Switching," by inventors Suresh Vobbilisetty, Phanidhar Koganti, and Jesse B. Willeke, filed 22 Apr. 2011, the disclosures of which are incorporated by reference herein.

BACKGROUND

1. Field

The present disclosure relates to network management. More specifically, the present disclosure relates to a method and system for facilitating multicast in a network.

2. Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as multicasting, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

One way to increase the throughput of a switch system is to use switch stacking. In switch stacking, multiple smaller-scale, identical switches are interconnected in a special pattern to form a larger logical switch. The amount of required manual configuration and topological limitations for switch stacking becomes prohibitively tedious when the stack reaches a certain size, which precludes switch stacking from being a practical option in building a large-scale switching system.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While TRILL brings many desirable features to layer-2 networks, some issues remain unsolved when TRILL RBridges manage and maintain multicast group membership.

SUMMARY

One embodiment of the present invention provides a switch. A switch includes a storage and a multicast management mechanism. The storage is configured to store an entry indicating a multicast group membership learned at a remote switch. The multicast management mechanism is coupled to the storage and is configured to suppress flooding of packets destined for the multicast group.

In a variation on this embodiment, the switch further includes a logical switch management mechanism configured to maintain a membership in a logical switch, wherein the logical switch is configured to accommodate a plurality of remotely located switches and operate as a single logical switch.

In a variation on this embodiment, the switch includes a data structure configured to store a non-flooding forwarding entry corresponding to the multicast group and the remote switch.

In a variation on this embodiment, the switch and the remote switch belong to a link aggregation, wherein the entry indicating the multicast group membership learned at the remote switch is treated as a multicast group membership learned locally at the switch.

In a variation on this embodiment, the switch includes a communication mechanism configured to transmit to the remote switch information learned locally on the multicast group membership.

In a variation on this embodiment, the multicast group is formed based on one or more of the following: Internet Group Management Protocol (IGMP) version 1, IGMP version 2, IGMP version 3, Multicast Listener Discovery (MLD) version 1, and MLD version 2.

In a variation on this embodiment, the switch is a TRILL routing bridge, wherein the multicast management mechanism is configured to perform IGMP or MLD snooping.

In a variation on this embodiment, the switch includes a communication mechanism configured to send IGMP state information in response to receiving a first join message or a last leave message from a locally coupled end device.

DETAILED DESCRIPTION

Figure 1:
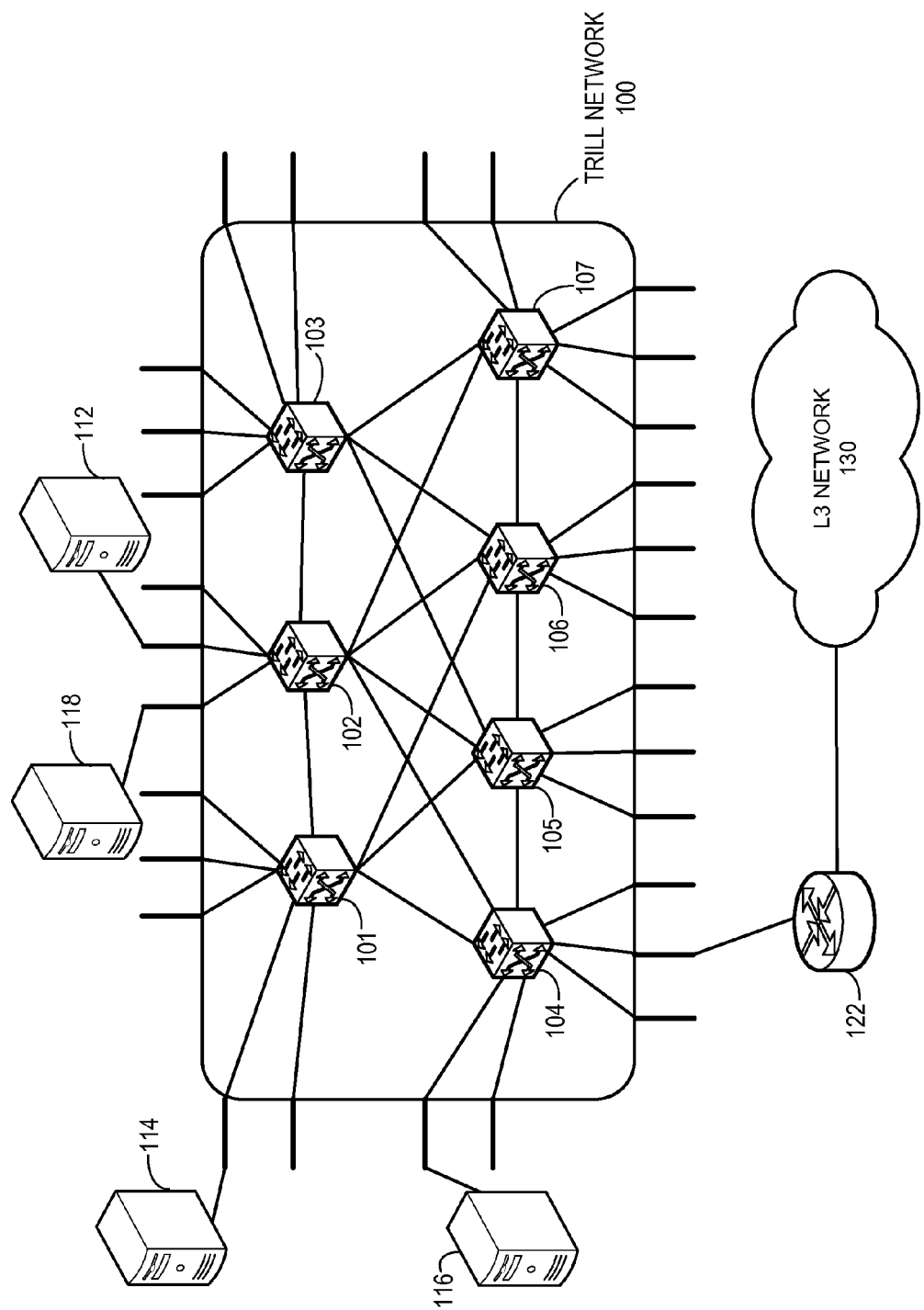
FIG. 1 illustrates an exemplary TRILL network that includes a plurality of RBridges that share multicast group membership information among themselves, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating scalable and flexible multicast in a TRILL network is solved by learning multicast group membership information from remote RBridges and forwarding multicast accordingly. In some embodiments, an RBridge may learn about multicast group membership information by examining IGMP packets. The RBridge then shares the multicast group membership information with other RBridges in the TRILL network. All RBridges in the TRILL network use the multicast group membership information learnt from local ports and from remote RBridges to collectively make the multicast forwarding decisions.

In some embodiments, a multicast-enabled layer-3 (e.g., IP) router may be coupled to the TRILL network. Under such a scenario, the router sends a multicast packet to one or more end devices coupled to the TRILL network. If the end device's multicast group membership information is not known to the ingress RBridge couple to the router, the default behavior for the ingress RBridge coupled to the router is to flood the packet to all edge and TRILL ports (except for the port on which the multicast packet is received). As a result, all end devices coupled to the RBridge along with all remote RBridges in the TRILL network receive the multicast packet. Each remote RBridge, in turn, forwards the packet to all their respective edge ports.

When an end device decides to join the multicast group, the end device sends a join message to the router. The ingress RBridge coupled to the end device receives the join message, learns the multicast group membership information, and stores the information in a database that stores the locally learned multicast group membership information. The RBridge then forwards the information to all remote RBridges in the TRILL network. Note that VLAN-group membership information learned on local ports is also distributed to other RBridges in the network. Each remote RBridge, including the RBridge coupled to the router, receives the information and stores the information in a database that stores remotely learned multicast group membership information. For any subsequent multicast packet, the ingress RBridge coupled to the router suppresses the default flooding behavior, as the RBridge is aware of the multicast group membership of the end device coupled to the TRILL network. Instead, the ingress RBridge forwards the multicast packet toward the egress RBridge to which the end device is coupled. Note that, since the intermediate RBridges also learn the end device's membership information, they also suppress the default flooding behavior for the multicast packet.

Although the present disclosure is presented using examples based on the TRILL protocol, embodiments of the present invention are not limited to TRILL networks, or networks defined in a particular Open System Interconnection Reference Model (OSI reference model) layer.

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to the application among RBridges. Other types of switches, routers, and forwarders can also be used.

In this disclosure, the term "edge port" refers to a port on an RBridge which sends/receives data frames in native Ethernet format. The term "TRILL port" refers to a port which sends/receives data frames encapsulated with a TRILL header and outer MAC header.

The term "end device" refers to a network device that is typically not TRILL-capable. "End device" is a relative term with respect to the TRILL network. However, "end device" does not necessarily mean that the network device is an end host. An end device can be a host, a conventional layer-2 switch, or any other type of network device. Additionally, an end device can be coupled to other switches or hosts further away from the TRILL network. In other words, an end device can be an aggregation point for a number of network devices to enter the TRILL network.

The term "RBridge identifier" refers to a group of bits that can be used to identify an RBridge. Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "RBridge identifier" is used as a generic term and is not limited to any bit format, and can refer to "RBridge ID" or "RBridge nickname" or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

In this disclosure, all the terms related to IGMP are used in a generic sense and are not limited to only the IGMP protocol. Other multicast protocols, such as the Multicast Listener Discovery (MLD) protocol, and different versions of such protocols, such as IGMP v1/v2/v3 and MLD v1/v2, etc., can also be used. The term "IGMP packet" refers to any data segment sent over a network containing any multicast control message. The term "IGMP query" refers to any message sent by a multicast-enabled layer-3 router to discover which end device is participating in a particular multicast group. The term "IGMP join" refers to any message sent by an end host requesting to join a particular multicast group. The term "IGMP leave" refers to any message sent by an end host requesting to leave a particular multicast group. In this disclosure, the term "IGMP control message" can refer to both IGMP join and IGMP leave messages. The term "multicast packet" refers to any data traffic associated with a particular multicast group.

In some embodiments, layer-3 processing capability can be enabled in RBridges in a TRILL network. Hence, the term "router" can refer to a stand-alone layer-3 (e.g., IP) router or the layer-3-capable portion of an RBridge. In this disclosure, the terms layer-3 and IP are used interchangeably.

Network Architecture

FIG. 1 illustrates an exemplary TRILL network that includes a plurality of RBridges that share multicast group membership information among themselves, in accordance with an embodiment of the present invention. As illustrated in FIG. 1, a TRILL network 100 includes RBridges 101, 102, 103, 104, 105, 106, and 107. End devices 112, 114, 116, and 118 are coupled to network 100 via ingress RBridges 102, 101, 104, and 102, respectively. A multicast-enabled router 122 is coupled to a layer-3 network 130 and to network 100 via ingress RBridge 104. Note that in some embodiments, TRILL network 100 can support multiple VLANs. An end device can participate in one or more VLANs and its multicast group membership could vary for each of these different VLANs.

RBridges in network 100 use edge ports to communicate to end devices and TRILL ports to communicate to other RBridges. For example, RBridge 104 is coupled to end device 116 via an edge port and to RBridges 105, 101, and 102 via TRILL ports. An end host coupled to an edge port may be a host machine or network device. For example, end devices 112, 114, and 116 are host machines while device 122 is a layer-3 router.

During operation, router 122 sends a multicast packet to network 100. If RBridge 104 does not have information on the members of this multicast group, RBridge 104 floods the packet to all edge ports except the port on which the packet is received. As a result, local end device 116 receives the packet.

In some embodiments, the packet is flooded to all TRILL ports as well. Under such a scenario, RBridges 101, 102, and 105 receive the packet. These RBridges, in turn, flood the packet to their edge and TRILL ports. For example, RBridge 102 transmits the packet to end device 112. Note that RBridge 102 does not send the packet to RBridge 104 as the packet was received from RBridge 104. Furthermore, if an RBridge receives multiple copies of the same packet, it uses one copy and discards the rest. For example, though RBridge 101 might receive the packet from both RBridges 104 and 102, it sends the packet to end device 114 only once.

In some embodiments, RBridge 104 creates a multicast distribution tree to all other RBridges and distributes the packet over the tree. The tree topology is maintained at each RBridge to distribute contents in network 100. Under such a scenario, each RBridge receives only one copy of the packet and floods the packet only to the ports that are part of the tree. In some embodiments, the tree is constructed as a breadth-first search (BFS) tree. Note that the multicast distribution tree can be a common tree, which includes all RBridges and can be sub-optimal in some cases, and which can be used by all multicast groups in the TRILL network. The multicast distribution tree can also be more specific to and optimized for a VLAN, which could include only RBridges that are members of a multicast group in a particular VLAN.

If an end device (e.g., end device 112) decides to join the multicast group (say, with an optimized distribution tree specific to a VLAN), end device 112 sends a join message to router 122. RBridge 102 receives the join message, learns the multicast group membership information, and stores the information in a local database. RBridge 102 then forwards the learned membership information to remote RBridges 101, 103, 104, 105, 106, and 107. Each remote RBridge receives the information and stores the information in its respective database that stores remotely learned multicast group membership information. As RBridge 104 is aware of the multicast group membership of end device 112, default flooding behavior is suppressed for all subsequent multicast packets from router 122 and these packets are only forwarded to RBridge 102. In other words, there is no default flooding on an RBridge's edge ports. When another end device 114 joins the multicast group, ingress RBridge 101 informs all other RBridges regarding the multicast group membership information. As a result, RBridge 104 forwards subsequent multicast packets from router 122 to RBridges 101 and 102, which forward the packets to end devices 114 and 112, respectively.

During operation that does not involve sharing of multicast group membership information among RBridges, when end device 112 joins a multicast group, RBridge 102 does not forward the information to other RBridges. As a result, only RBridge 102 stops flooding of subsequent multicast packets for the multicast group to its edge ports. Other RBridges, such as RBridges 101 and 104, continue flooding multicast packets to end devices 114 and 116, respectively. Under such a scenario, RBridges in network 100 continue sending unnecessary multicast packets that leads to higher bandwidth consumption.

In one embodiment of the present invention, as illustrated in FIG. 1, if end device 118 decides to join the multicast group, end device 118 sends a join message to router 122. As all other RBridges have learned about the multicast group membership of end device 112 (and hence RBridge 102's participation in the multicast group), the multicast group membership information of end device 118 is kept local to RBridge 102 and not forwarded to other RBridges. Hence, a given RBridge updates other RBridges with the membership information of only the first join message learned at the RBridge. As a result, the number of messages associated with multicast group membership updates is reduced in TRILL network 100.

Similarly, if end device 112 leaves the multicast group, RBridge 102 does not forward the information to other RBridges, as end device is 118 still a member of the multicast group. However, if end device 118 leaves the group as well, RBridge 102 forwards the information to other RBridges. Hence, a given RBridge updates other RBridges with the membership information of only the last leave message learned at the RBridge. This configuration further reduces the number of messages associated with multicast group membership updates in network 100.

In some embodiments, when end device 118 sends the join message to router 122 for a multicast group, all RBridges in network 100 suppress sending subsequent join messages to router 122 for the same multicast group. For example, during operation, when end device 114 sends a join message to router 122 for the same multicast group, ingress RBridge 101 receives the message and recognizes that there is already a member to the multicast group coupled to network 100. RBridge 101 then suppresses sending the join message to router 122. Similarly, when end device 118 sends a leave message to router 122 for the multicast group, the message is suppressed at RBridge 102, as end device 114 is still a member to the multicast group. When end device 114 sends a leave message for the multicast group, RBridge 101 sends the message to router 122, as it is the last leave message from network 100. In some embodiments, RBridges in network 100 form a logical switch fabric. The scheme of sending out only the first join and the last leave messages can be applicable not only to a particular RBridge but to the fabric level as a whole; i.e., it is possible to have multicast control messages suppression at the switch fabric level.

During operation that does not involve selective sharing of multicast group membership information among RBridges, when end device 112 joins a multicast group associated with router 122, RBridge 102 forwards the information to its TRILL ports as well as to router 122. When end device 118 joins the multicast group, RBridge 102 forwards the information as well. Similarly, when either of end devices 118 and 112 leaves the multicast group, RBridge 102 forwards the multicast group update information to all RBridges as well as router 122. As a result, even though router 122 and other RBridges are already aware of the membership information of end device 112, they continue to receive membership information for other end devices.

In some embodiments, the TRILL network may be a virtual cluster switch (VCS). In a VCS, any number of RBridges in any arbitrary topology may logically operate as a single switch. Any new RBridge may join or leave the VCS in a "plug-and-play" fashion without manual configuration.

Note that TRILL is only used as a transport between the switches within network 100. This is because TRILL can readily accommodate native Ethernet frames. Also, the TRILL standards provide a ready-to-use forwarding mechanism that can be used in any routed network with arbitrary topology. Embodiments of the present invention should not be limited to using only TRILL as the transport. Other protocols (such as multi-protocol label switching (MPLS)), either public or proprietary, can also be used for the transport.

Flooding Suppression of Multicast Packets

Figure 2A:
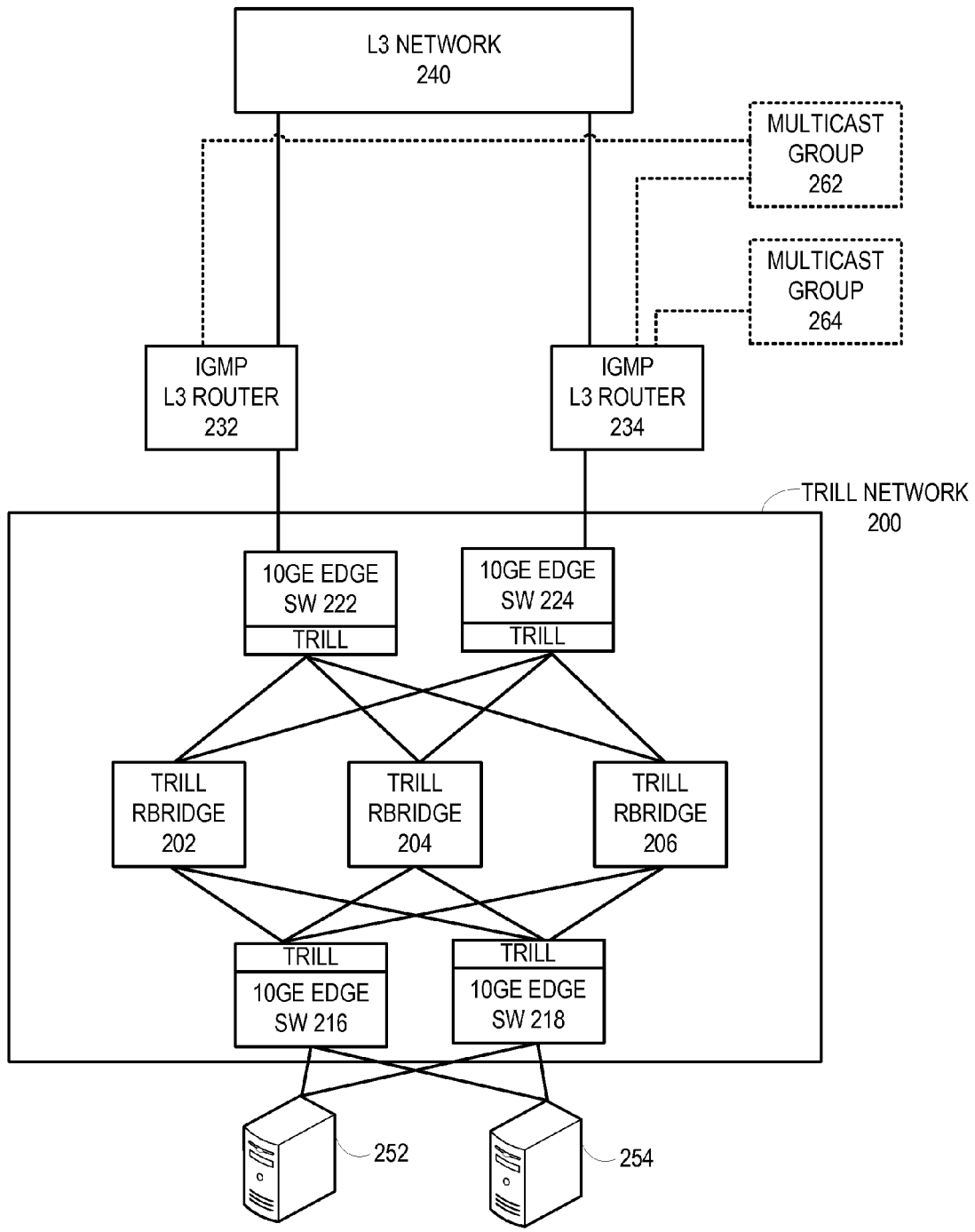
FIG. 2A illustrates an exemplary network configuration of end devices, including multicast-enabled layer-3 routers, coupled to a TRILL network, in accordance with an embodiment of the present invention.

FIG. 2A illustrates an exemplary network configuration of end devices, including multicast-enabled layer-3 routers, coupled to a TRILL network, in accordance with an embodiment of the present invention. In this example, a TRILL network 200 includes a number of TRILL RBridges 202, 204, and 206. Network 200 also includes RBridges 216, 218, 222, and 224, each with a number of edge ports which can be coupled to external networks. For example, RBridges 216 and 218 are coupled with end devices 252 and 254 via 10GE edge ports. RBridges in network 200 are interconnected with each other using TRILL ports. RBridges 222 and 224 are coupled to multicast-enabled layer-3 routers 232 and 234, respectively. In this example, router 232 is associated with multicast group 262, and router 234 is associated with multicast groups 262 and 264 (denoted using dotted lines). Routers 232 and 234 are coupled to a layer-3 network 240.

Router 232 sends a multicast packet for multicast group 262 to network 200 via ingress RBridge 222. RBridge 222 forwards the packet to all other RBridges in network 200. If an end device coupled to network 200 (e.g., end device 252) joins multicast group 262, all RBridges in network 200 receive the multicast group membership information via ingress RBridge 216. Consequently, RBridge 222 suppresses flooding of all subsequent multicast packets for multicast group 262 from router 232. Note that, under such a scenario, all multicast packets for multicast group 262 are suppressed regardless of the router it is coming from. For example, RBridge 224 is aware of the membership of end device 252 in multicast group 262. Hence, if a multicast packet for multicast group 262 arrives from another router 234 to TRILL network 200 at ingress RBridge 224, the default flooding behavior is suppressed.

However, when router 234 sends a multicast packet for a different multicast group 264 to network 200 via ingress RBridge 224, the packet is flooded across network 200. Only if an end device coupled to network 200 (e.g., end device 254) joins multicast group 264, subsequent multicast packets for multicast group 264 are suppressed. Hence, the flooding of multicast packets is suppressed in a TRILL network depending on membership in a specific multicast group.

Figure 2B:
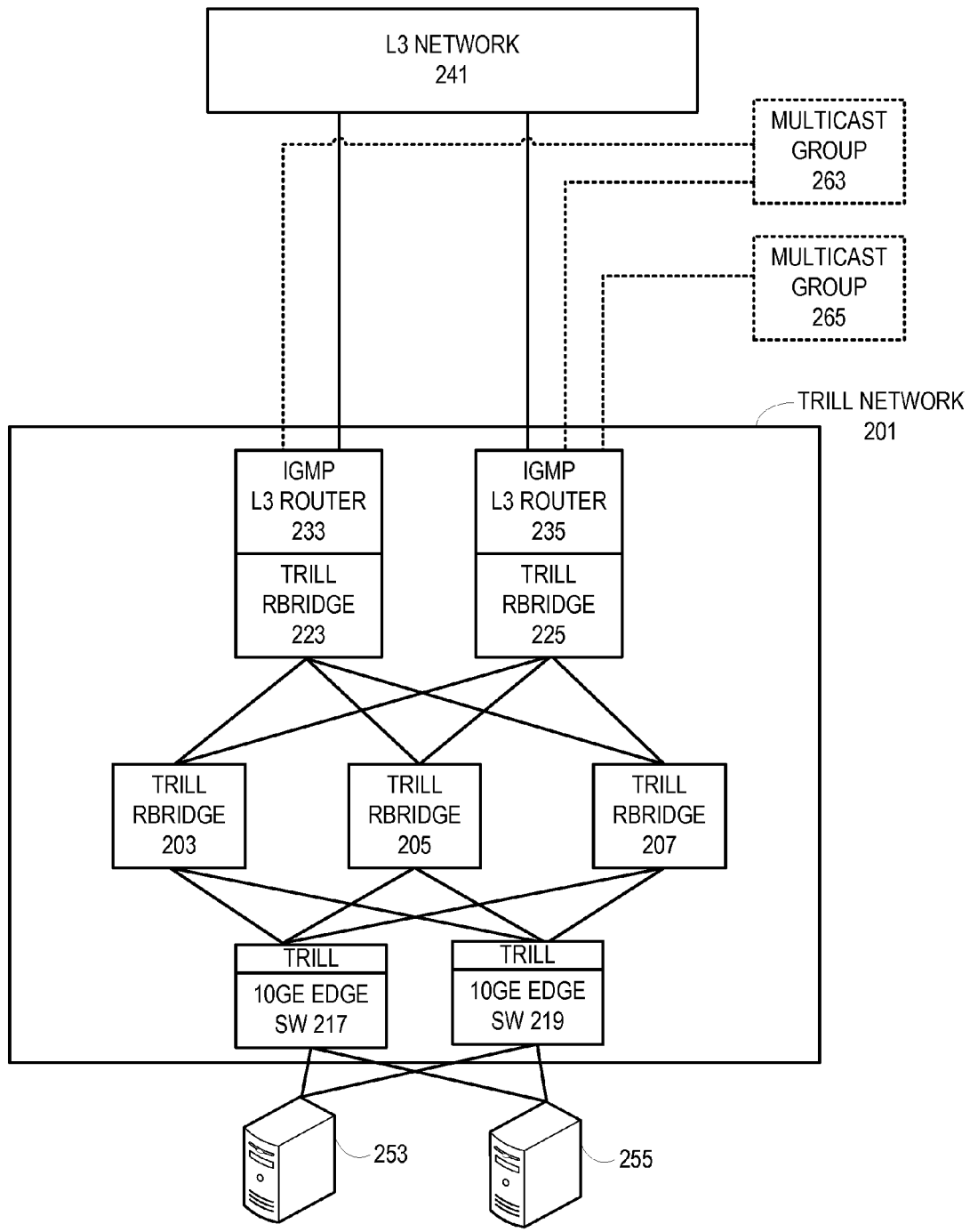
FIG. 2B illustrates an exemplary network configuration where layer-3-enabled RBridges in a TRILL network support multicast, in accordance with an embodiment of the present invention.

FIG. 2B illustrates an exemplary network configuration where layer-3-enabled RBridges in a TRILL network support multicast, in accordance with an embodiment of the present invention. In this example, a TRILL network 201 includes a number of TRILL RBridges 203, 205, and 207. Network 201 also includes RBridges 217 and 219, each with a number of edge ports which can be coupled to external networks. For example, RBridges 217 and 219 are coupled with end devices 253 and 255 via 10GE edge ports. RBridges in network 201 are interconnected with each other using TRILL ports. Also included in network 201 are RBridges 223 and 225, which are layer-3 capable and coupled to an IP network 241 as IP routers 233 and 235, respectively. In this example, router 233 is associated with multicast group 263 and router 235 is associated with multicast groups 263 and 265 (denoted using dotted lines). Routers 233 and 235 are coupled to a layer-3 network 241. Note that RBridge 223 and router 233 are the same physical device. In this scenario, routers 233 and 235 are connected to a TRILL network and could potentially have membership in a common multicast group 263 for TRILL network 201 (assuming TRILL network 201 has one single VLAN). By virtue of layer-3 multicast protocol (e.g., protocol-independent multicast, PIM), a designated-router election process would result in only one of the two routers being able to forward data from an upstream source (such as network 241) downstream into network 201. Similarly, only one router would be elected to forward multicast traffic from network 201 to network 241.

Similar to a layer-3 router participating in a multicast group, the layer-3 enabled portion of RBridge 223, router 233, sends a multicast packet for multicast group 263 to network 201 via corresponding RBridge 223. RBridge 223 operates as a regular TRILL RBridge and floods the packet in network 201. When an end device 253 joins multicast group 263, RBridges 223 and 225 suppress flooding of all multicast packets for multicast group 263. Similarly, when router 235 sends a multicast packet for a different multicast group 265 to network 201 via corresponding RBridge 225, the message is flooded across network 201. When end device 255 joins multicast group 265, the flooding of subsequent multicast packets to multicast group 265 is suppressed.

Multicast Groups Across VLANs

Figure 3:
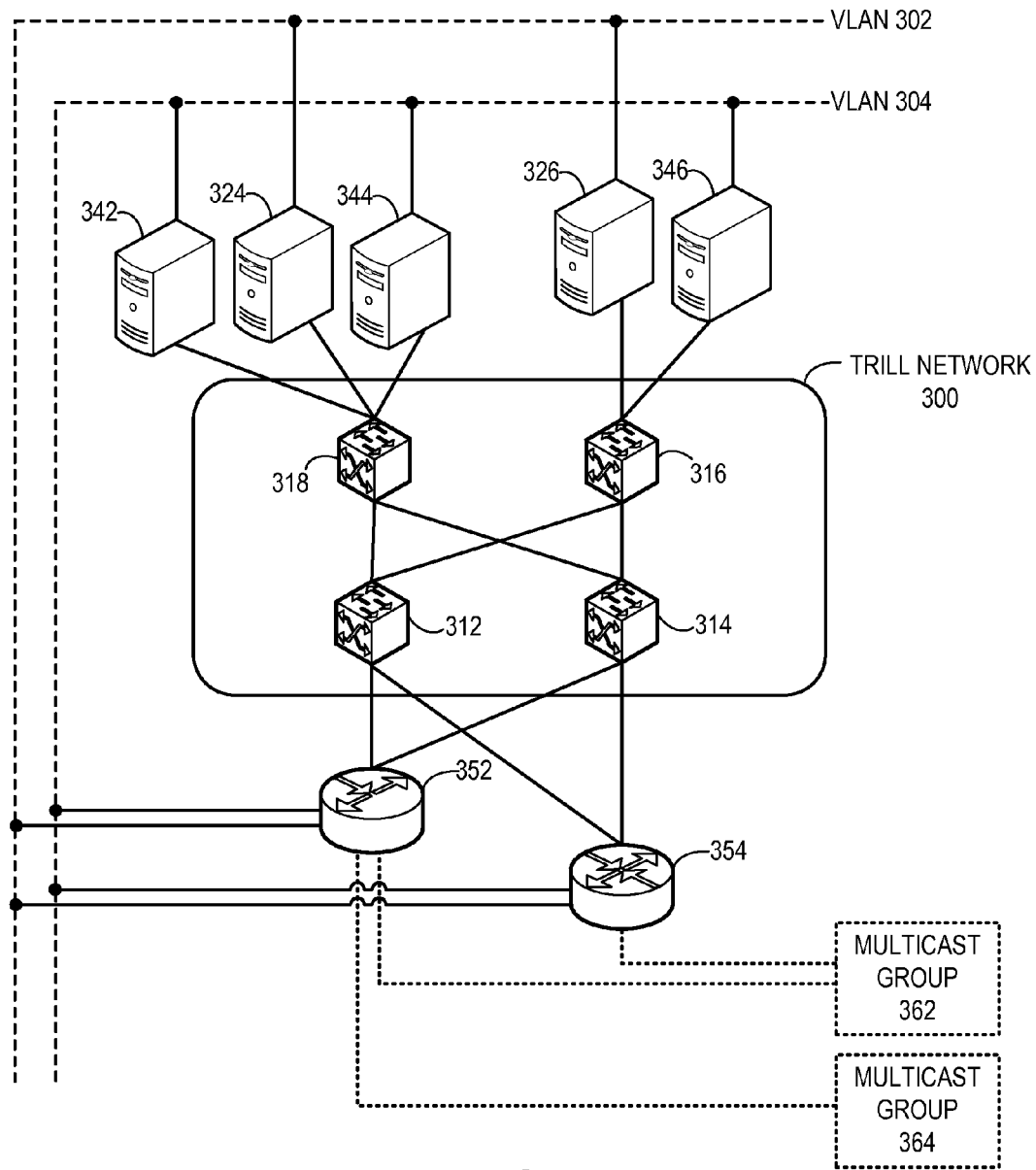
FIG. 3 illustrates an exemplary configuration of end devices belonging to different Virtual Local Area Networks (VLANs) coupled to a TRILL network which shares multicast group membership information among RBridges, in accordance with an embodiment of the present invention.

FIG. 3 illustrates an exemplary configuration of end devices belonging to different VLANs coupled to a TRILL network which shares multicast group membership information among RBridges, in accordance with an embodiment of the present invention. In this example, a TRILL network 300 includes TRILL RBridges 312, 314, 316, and 318. End devices 342, 324, and 344 are coupled to RBridge 318, and end devices 326 and 346 are coupled to RBridge 316. RBridges 312 and 314 are coupled to layer-3 routers 352 and 354. Router 352 is associated with multicast groups 362 and 364, and router 354 is associated with multicast group 362. End devices 342, 344, and 346 belong to VLAN 304, and end devices 324 and 326 belong to VLAN 302. TRILL network 300 exposes all underlying VLANs to layer-3 routers connected to network 300. Consequently, both VLANs 302 and 304 are visible at both routers 352 and 354.

During operation, an end device belonging VLAN 302 (e.g., end device 324) sends an IGMP join message for multicast group 362. The message is forwarded via ingress RBridge 318 to both routers 352 and 354. RBridge 318 updates its database for locally learned multicast group membership information and notifies all other RBridges in network 300 about the membership. In some embodiments, RBridge 318 sends the membership information to each RBridge in network 300 using VCS update messages.

Upon receiving the membership information, all other RBridges update their databases for remotely learned multicast group membership information. Each RBridge suppresses flooding of any subsequent multicast packet from both routers for multicast group 362 to VLAN 302. However, RBridges in network 300 continue to flood subsequent multicast packets for multicast group 362 to VLAN 304.

Similarly, router 352 sends multicast packet for multicast group 364. The packets are flooded to both VLANs 302 and 304. If an end device belonging to VLAN 304 (e.g., end device 346) joins multicast group 364, then the flooding is suppressed for VLAN 304. However, the subsequent multicast packets for multicast group 364 are flooded to VLAN 302. If an end device belonging to VLAN 302 (e.g., end device 326) joins multicast group 364, then the flooding is suppressed for VLAN 302 as well.

IGMP Packet Processing

Figure 4A:
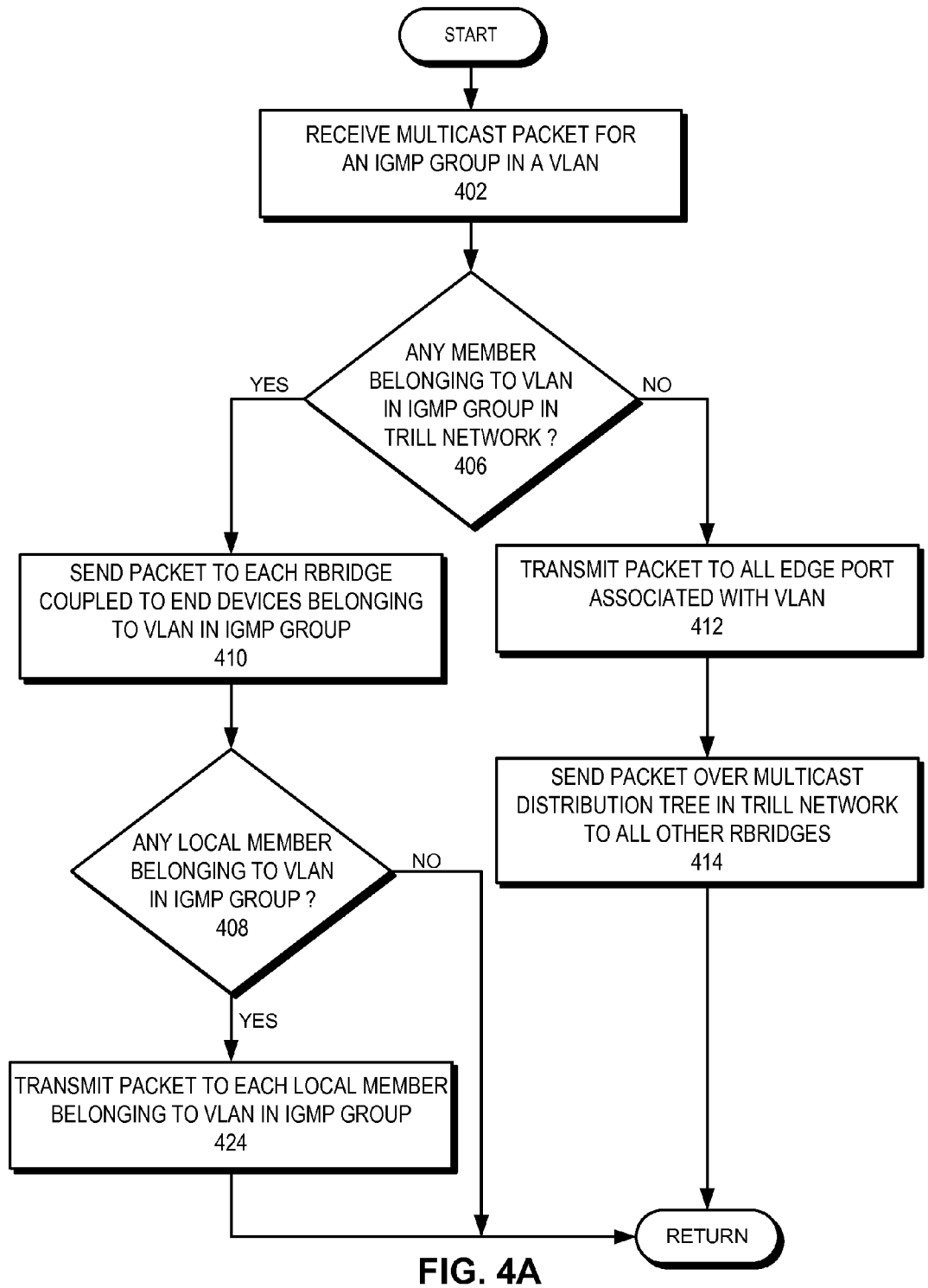
FIG. 4A presents a flowchart illustrating a first process of an RBridge forwarding a multicast packet in a TRILL network based on shared multicast group membership information, wherein the multicast packet is selectively distributed in the TRILL network, in accordance with an embodiment of the present invention.

FIG. 4A presents a flowchart illustrating a first process of an RBridge forwarding a multicast packet in a TRILL network based on shared multicast group membership information, wherein the multicast packet is selectively distributed in the TRILL network, in accordance with an embodiment of the present invention. During operation, an RBridge receives a multicast packet from an edge port for a multicast group in a VLAN (operation 402). If the packet is received on an edge port, then the packet is sent from an end device coupled to the RBridge.

The RBridge then checks whether it has learnt about the multicast group membership information for any local or remote end device belonging to the VLAN (operation 406). If so, flooding of the packet is suppressed at the RBridge. The RBridge then forwards the packet to each RBridge coupled to end devices with membership to the multicast group (operation 410). For example, in FIG. 1, assume end devices 112 and 114 are member of a multicast group. In this first process, RBridge 104 forwards the packet to only to RBridges 101 and 102. The RBridge also checks whether any local end device coupled to a local port belongs to the VLAN and has membership in the multicast group (operation 408). If so, the packet is transmitted to each such local end device (operation 424). If no such end device coupled to the TRILL network belonging to the VLAN has membership in the multicast group, the packet is discarded. If the RBridge has not learnt about the multicast group membership information (operation 406), the RBridge transmits the packet to all edge ports belonging to the VLAN (operation 412) and sends the packet to all other RBridges in the TRILL network over a multicast distribution tree (operation 414).

Figure 4B:
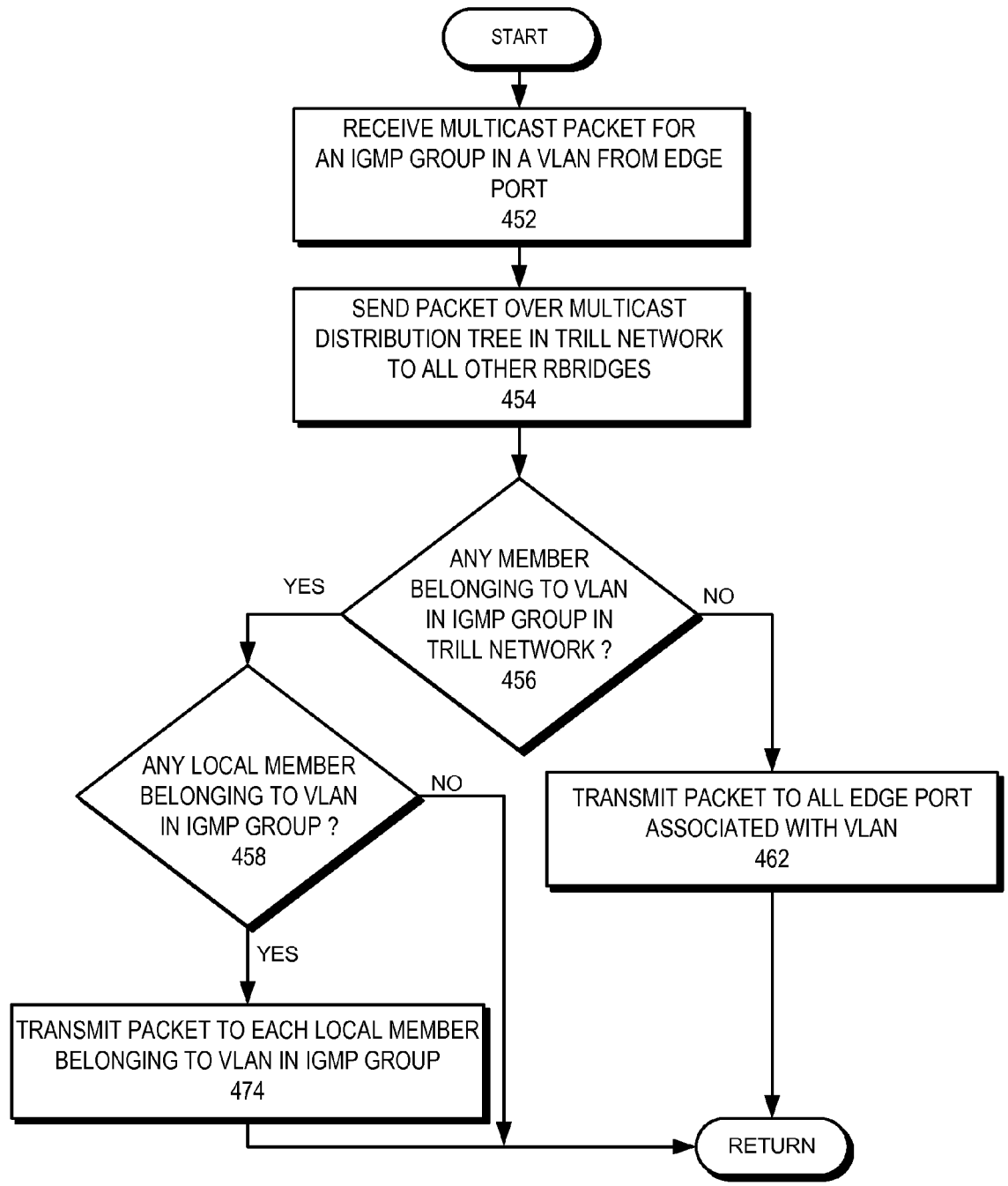
FIG. 4B presents a flowchart illustrating a second process of an RBridge forwarding a multicast packet in a TRILL network based on shared multicast group membership information, wherein the multicast packet is distributed to all other RBridges in the TRILL network, in accordance with an embodiment of the present invention.

FIG. 4B presents a flowchart illustrating a second process of an RBridge forwarding a multicast packet received from an edge port in a TRILL network based on shared multicast group membership information, wherein the multicast packet is distributed to all other RBridges in the TRILL network, in accordance with an embodiment of the present invention. In this second process, upon receiving a multicast packet in a VLAN for a multicast group (operation 452), even if the RBridge has learnt about the multicast group membership information (operation 456), the RBridge still forwards the packet to all other RBridges in the TRILL network (operation 454), instead of distributing the packet to only those RBridges that have end devices with membership to the multicast group coupled to it (operation 410 in FIG. 4A). For example, in FIG. 1, assume end devices 112 and 114 are member of a multicast group. In this second process, RBridge 104 forwards the packet to all other RBridges instead of only to RBridges 101 and 102. If the RBridge has not learned any membership information of a multicast group, the packet is transmitted to all edge port associated with the VLAN (operation 462). Otherwise, the RBridge checks whether any local member belonging to the VLAN has a membership to the group (operation 458). If so, the packet it forwarded to each local member in the group (operation 474).

Multicast Membership Management

Figures 5A, 5B:
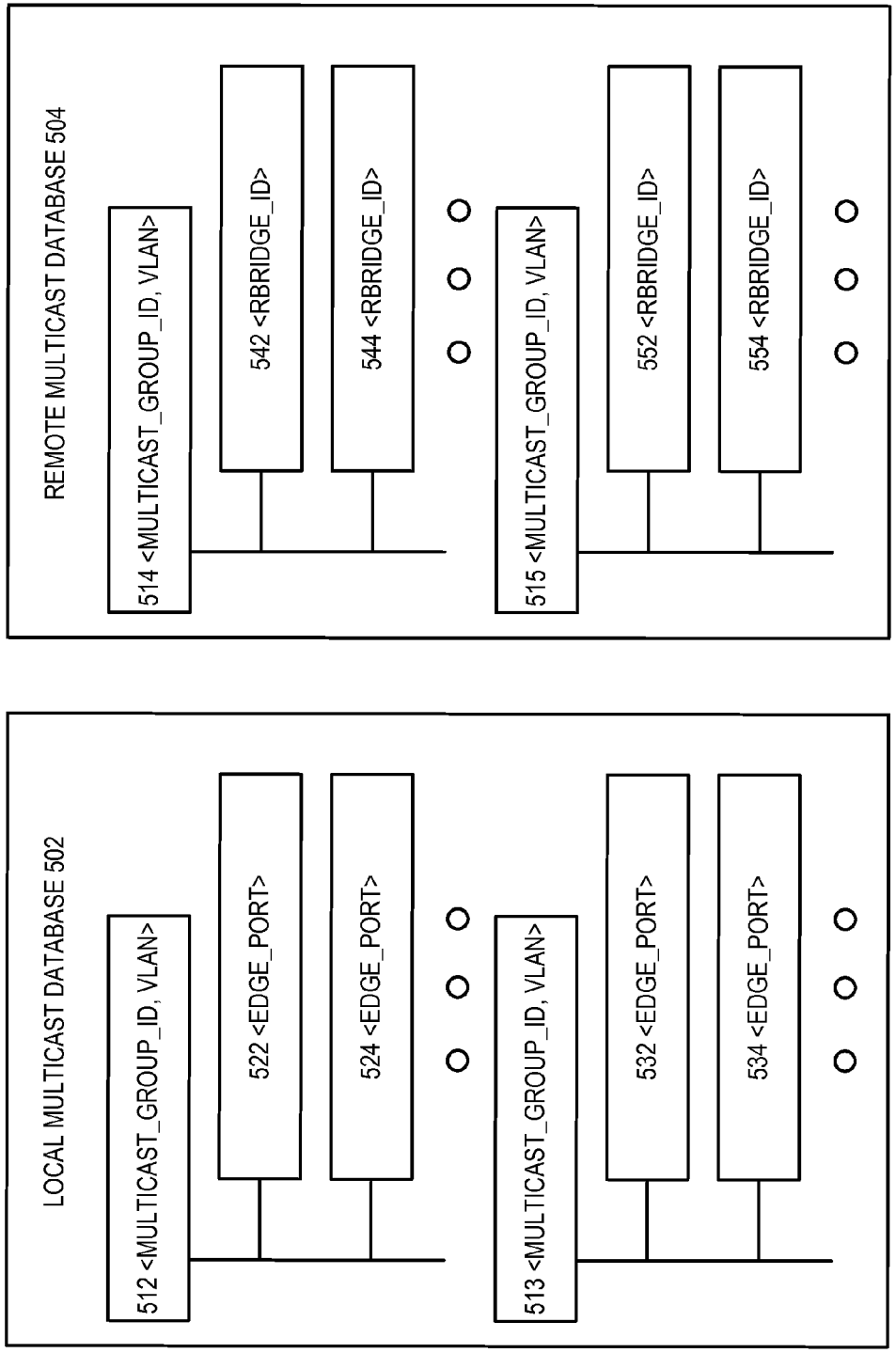
FIG. 5A illustrates an exemplary database that stores locally learned multicast group membership information associated with each VLAN, in accordance with an embodiment of the present invention.
FIG. 5B illustrates an exemplary database that stores remotely learned multicast group membership information associated with each VLAN, in accordance with an embodiment of the present invention.

In one embodiment, each RBridge maintains two databases to store multicast group membership information for local and remote end devices belonging to specific VLANs. FIG. 5A illustrates an exemplary database that stores locally learned multicast group membership information associated with each VLAN, in accordance with an embodiment of the present invention. Local multicast database 502 in FIG. 5A stores records for each multicast group for each VLAN (a multicast group and VLAN pair) for local end devices. For example, database 502 stores records 512 and 513 for different multicast groups and VLAN pairs, each containing identifiers for the multicast group and the VLAN. Each such pair can be different from another pair in three ways: 1) different multicast groups but same VLAN, 2) same multicast group but different VLANs, and 3) different multicast groups and different VLANs.

In database 502, records 512 and 513 are for different such pairs. Records 522 and 524 store edge port information of the local end devices associated with the multicast group and VLAN pair corresponding to record 512. Similarly, records 532 and 534 store edge port information of the local end devices associated with the multicast group and VLAN pair corresponding to record 513.

FIG. 5B illustrates an exemplary database that stores remotely learned multicast group membership information associated with each VLAN, in accordance with an embodiment of the present invention. Remote multicast database 504 stores records for multicast group and VLAN pairs in remote RBridges. For example, database 504 includes records 514 and 515 that store identifiers for two different remote multicast group and VLAN pairs. Note that storing only identifiers for remote multicast group and VLAN pairs provides a scalable solution to maintain awareness of remote multicast group membership. As an RBridge is only responsible for forwarding multicast traffic to its local edge ports, it only requires storing the identifiers to suppress flooding to the specific multicast group and VLAN pair.

In some embodiments, records 514 and 515 further include RBridge identifier. For example, records 542 and 544 store the RBridge IDs of RBridges that are coupled to end devices associated with the multicast group and VLAN pair corresponding to record 514. RBridge IDs in records 542 and 544 indicate that the corresponding RBridges have at least one end device coupled to them that belongs to the VLAN and has a membership in the multicast group. Similarly, records 552 and 554 store the RBridge IDs of the RBridges that are coupled to end devices associated with the multicast group and VLAN pair corresponding to record 515.

Figure 6A:
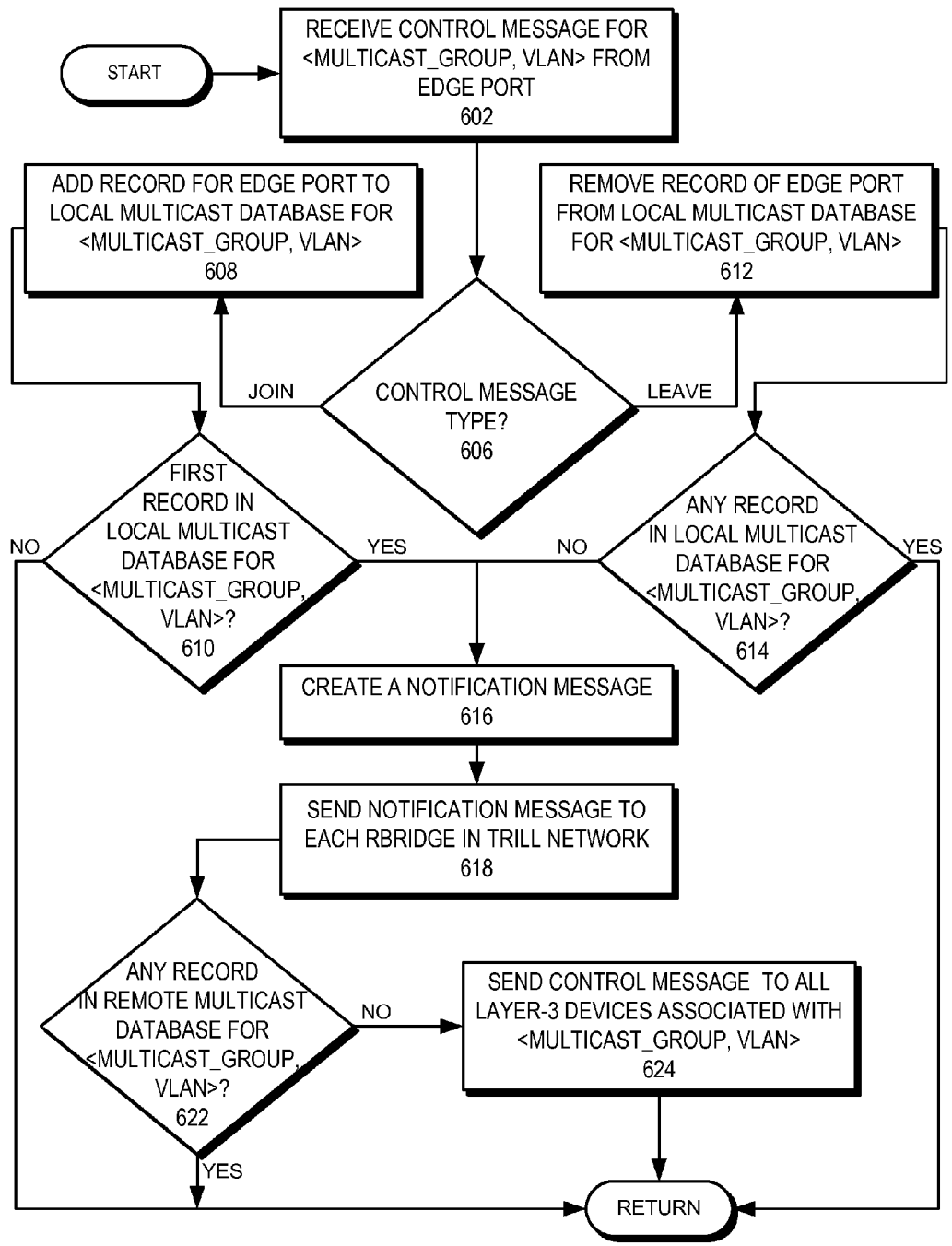
FIG. 6A presents a flowchart illustrating the process of an RBridge forwarding multicast control messages and locally learned multicast membership information, and updating a database that stores locally learned multicast group membership information, in accordance with an embodiment of the present invention.

FIG. 6A presents a flowchart illustrating the process of an RBridge forwarding multicast control messages and locally learned multicast membership information, and updating a database that stores locally learned multicast group membership information, in accordance with an embodiment of the present invention. Upon receiving a control message for a multicast group in a VLAN from an edge port (operation 602), the RBridge examines the message type (operation 606). If the control message is a join message, the RBridge adds a record for the edge port to a local multicast database for the multicast group and VLAN pair corresponding to the join message (operation 608). The RBridge then checks whether the added record is the first record for the multicast group and VLAN pair (operation 610). If so, the RBridge creates a notification message containing the multicast group membership information (operation 616) and sends the notification message to each RBridge in the TRILL network (operation 618). In some embodiments, the notification message is a VCS update message.

If the control message is a leave message (operation 606), the RBridge removes the record from the local multicast database for the multicast group and VLAN pair corresponding to the leave message (operation 612). The RBridge then checks whether there is any record left for the multicast group and VLAN pair in the database (operation 614). No record in the database indicates that the leave message is a last leave message. The RBridge then creates a notification message containing the membership information (operation 616) and forwards the information to each RBridge in the TRILL network (operation 618).

After forwarding the information about the control message to all RBridges (operation 618), the RBridge checks whether the remote multicast database contains any record for the multicast group and VLAN pair (operation 622). If so, then another RBridge has already forwarded the message to layer-3 devices associated with the multicast group and VLAN pair. Hence, the RBridge recognizes the control message not to be the first join or last leave message for the VLAN from the TRILL network to which the RBridge is coupled and does not forward the message. If the remote multicast database does not contain any record for the multicast group and VLAN pair, then the control message is the first join or the last leave message for the VLAN from the TRILL network. Hence, the RBridge forwards the message to all layer-3 devices coupled to the TRILL network and associated with the multicast group and VLAN pair (operation 624). Note that the RBridge notifies other RBridges about the membership information only if the received control message is a first join or a last leave message from a local end device for the multicast group and VLAN pair. Otherwise, the RBridge does not send any notification to other RBridges to reduce the number of IGMP messages in the TRILL network. Similarly, the RBridge forwards the control message to layer-3 devices associated with the multicast group and VLAN pair only if the received control message is a first join or a last leave message for the VLAN from the TRILL network. Otherwise, the RBridge does not send the control message to reduce the number of IGMP messages from the TRILL network. In some embodiments, the RBridge is a member switch in a VCS and it suppresses multicast control messages at both RBridge and VCS fabric level.

Figure 6B:
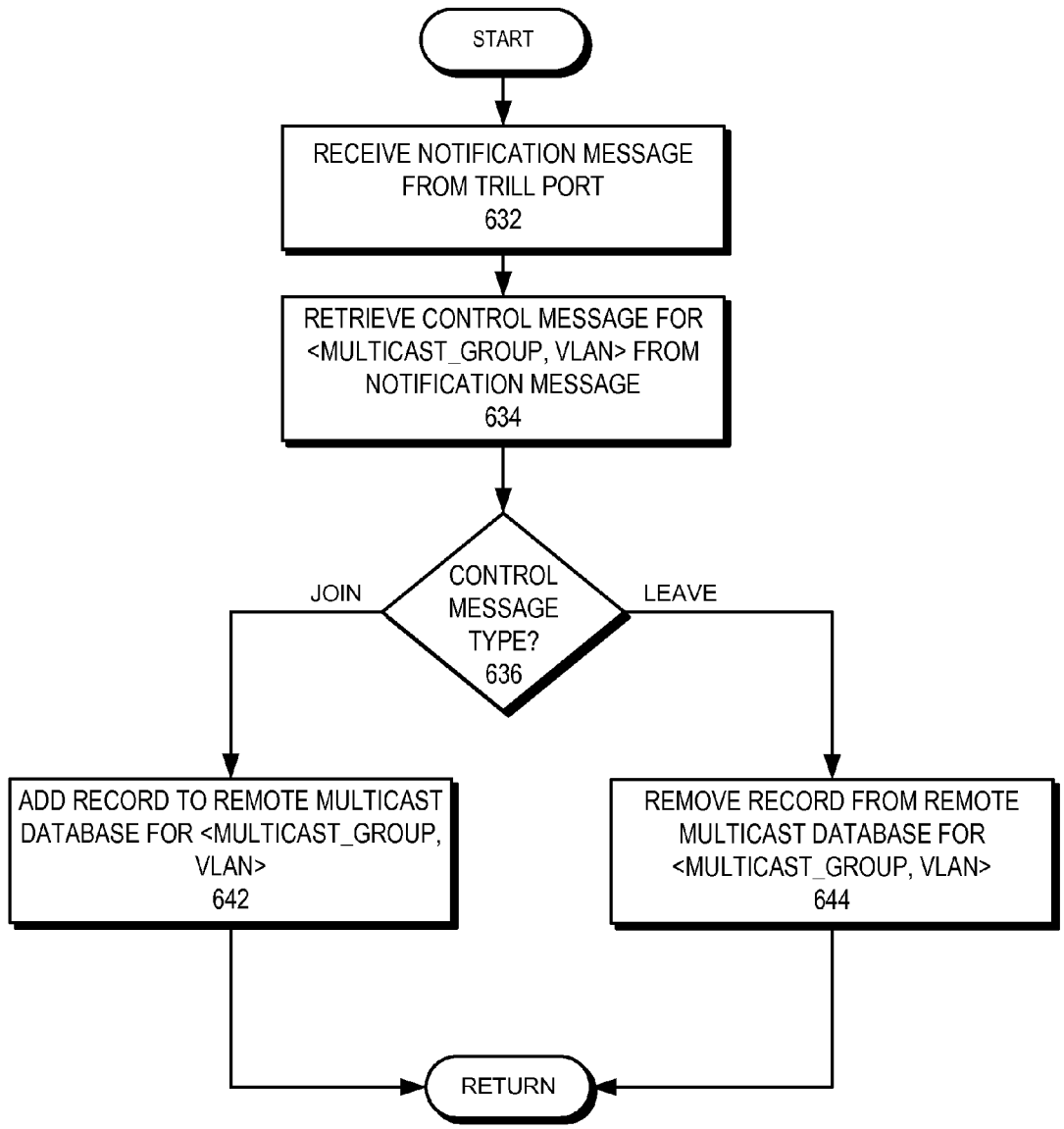
FIG. 6B presents a flowchart illustrating the process of an RBridge updating a database that stores remotely learned multicast group membership information, in accordance with an embodiment of the present invention.

FIG. 6B presents a flowchart illustrating the process of an RBridge updating a database that stores remotely learned multicast group membership information, in accordance with an embodiment of the present invention. Upon receiving a notification message from a TRILL port (operation 632), the RBridge retrieves the control message for a multicast group and VLAN pair from the notification message (operation 634). The RBridge then examines the message type (operation 636). If the control message is a join message, the RBridge adds a record to a remote multicast database for the multicast group and VLAN pair corresponding to the join message (operation 642). If the control message is a leave message, the RBridge removes the record from the remote multicast database for the multicast group and VLAN pair corresponding to the leave message (operation 644). The record added to or removed from the remote IGMP database can be the RBridge identifier of the ingress RBridge identifier of the notification message, as described in conjunction with FIG. 5B.

Virtual Link Aggregation

Figure 7:
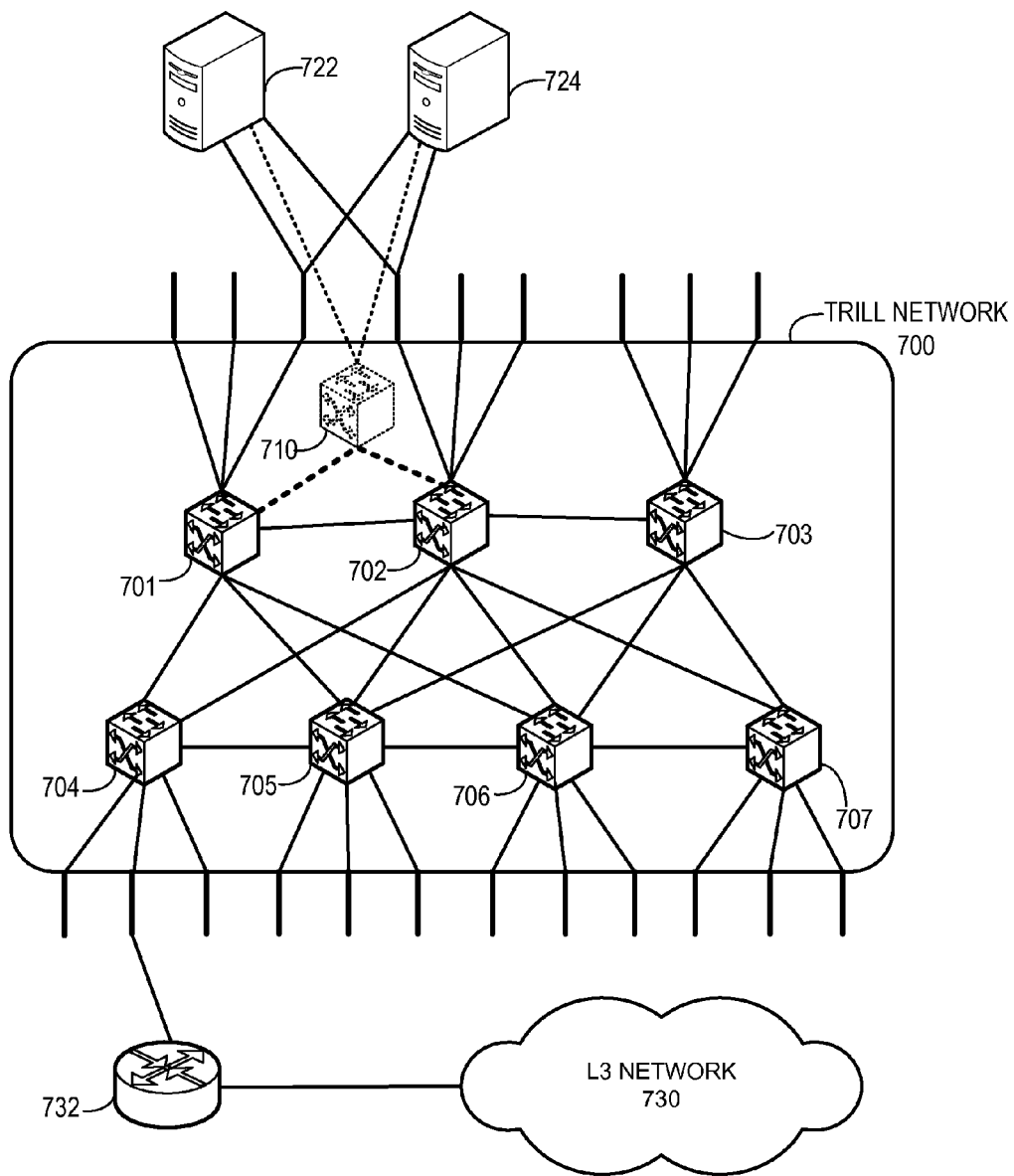
FIG. 7 illustrates an exemplary network where a virtual RBridge identifier is assigned to two physical TRILL RBridges which are coupled to end devices via divided aggregate links, in accordance with an embodiment of the present invention.

FIG. 7 illustrates an exemplary network where a virtual RBridge identifier is assigned to two physical TRILL RBridges which are coupled to end devices via divided aggregate links, in accordance with an embodiment of the present invention. As illustrated in FIG. 7, a TRILL network 700 includes seven RBridges, 701, 702, 703, 704, 705, 706, and 707. End devices 722 and 724 are both dual-homed and coupled to RBridges 701 and 702. The goal is to allow a dual-homed end station to use both physical links to two separate TRILL RBridges as a single, logical aggregate link, with the same media access control (MAC) address. Such a configuration would achieve true redundancy and facilitate fast protection switching.

RBridges 701 and 702 are configured to operate in a special "trunked" mode for end devices 722 and 724. End devices 722 and 724 view RBridges 701 and 702 as a common virtual RBridge 710, with a corresponding virtual RBridge identifier. Dual-homed end devices 722 and 724 are considered to be logically coupled to virtual RBridge 710 via logical links represented by dotted lines. Virtual RBridge 710 is considered to be logically coupled to both RBridges 701 and 702, optionally with zero-cost links (also represented by dotted lines). Among the links in a link trunk, one link is selected to be a primary link. For example, the primary link for end device 722 can be the link to RBridge 701. RBridges which participate in link aggregation and form a virtual RBridge are referred to as "partner RBridges." Operation of virtual RBridges for multi-homed end devices is specified in U.S. patent application Ser. No. 12/725,249, entitled "Redundant Host Connection in a Routed Network," the disclosure of which is incorporated herein in its entirety.

A layer-3 multicast-enabled router 732 is coupled to network 700 via ingress RBridge 704. Router 732 is also coupled to a layer-3 network 730. When end device 722 sends a join message to router 732 for a multicast group, it is received by ingress RBridge 701. RBridge 701 notifies the partner RBridge 702 about the membership, and both RBridges 701 and 702 add the record to their local multicast database. RBridge 701 encapsulates the message in a TRILL packet with the virtual RBridge identifier as the ingress RBridge identifier and forwards the packet to all other RBridges in network 700. All other RBridges add a record to their remote multicast database for the multicast group using the virtual RBridge identifier. Similarly, for leave messages for multicast groups corresponding to the virtual RBridge identifier, partner RBridges remove corresponding records from their local multicast database, and all other RBridges remove corresponding records from their remote multicast database.

Figure 8A:
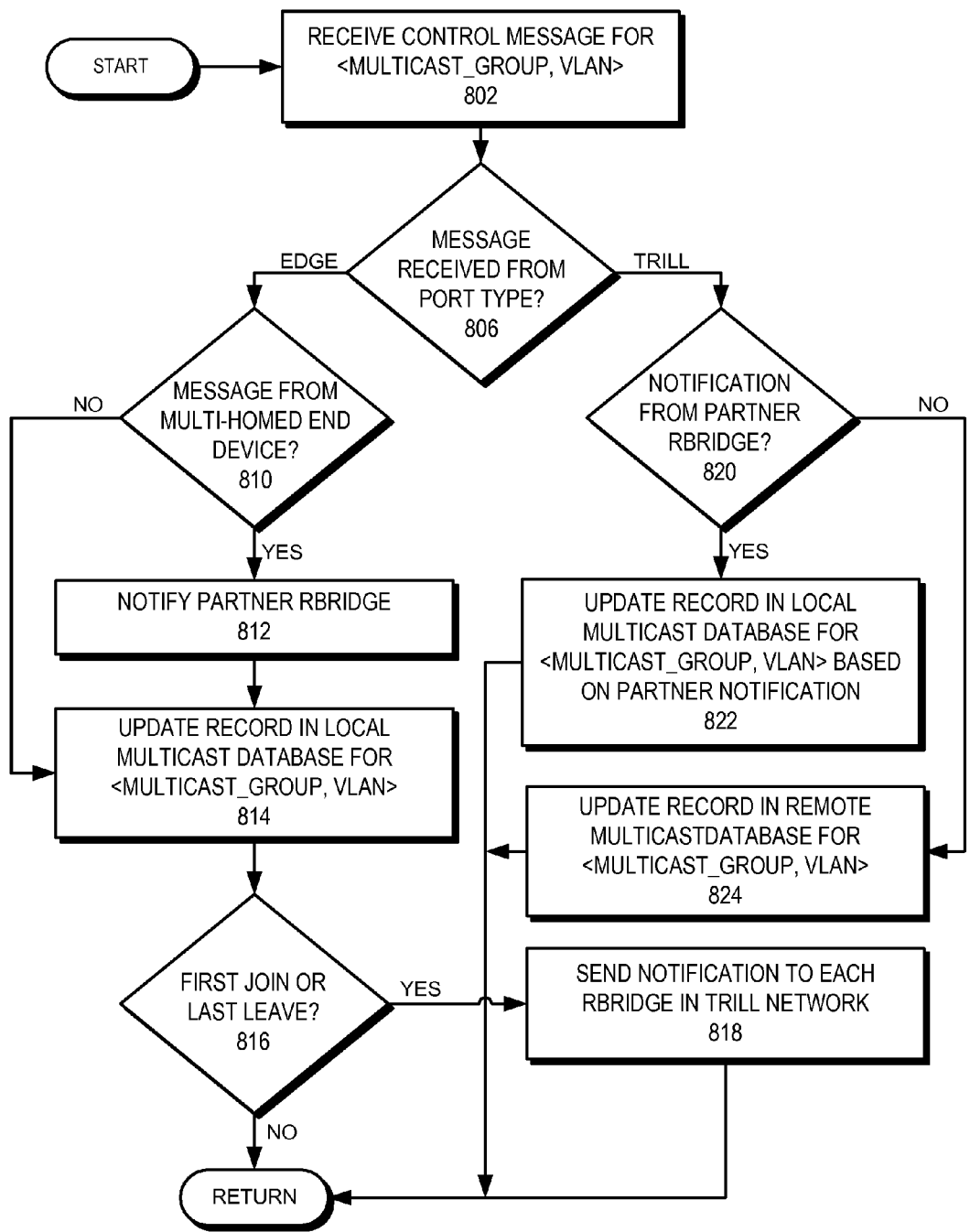
FIG. 8A presents a flowchart illustrating the process of an RBridge distributing a multicast control message across a TRILL network with virtual link aggregation support, and accordingly updating databases configured to maintain multicast group membership information, in accordance with an embodiment of the present invention.

FIG. 8A presents a flowchart illustrating the process of an RBridge distributing a multicast control message across a TRILL network with virtual link aggregation support, and accordingly updating databases configured to maintain multicast group membership information, in accordance with an embodiment of the present invention. Upon receiving a multicast control message (operation 802), the RBridge determines the port type from which the frame was received (operation 806). If the control message is received at an edge port, the RBridge checks if the message is from a multi-homed end device (operation 810). If not, the RBridge updates records in the local multicast database (operation 814) and checks if the control message is a first join or a last leave message for a multicast group and VLAN pair (operation 816), as described in conjunction with FIG. 6A. If the packet is from a multi-homed end device (operation 810), the RBridge sends a notification message to each partner RBridge that shares a virtual RBridge (operation 812). The RBridge then updates records in local IGMP database (operation 814) and checks if the control message is a first join or a last leave message for a multicast group and VLAN pair (operation 816). If the control message is either a first join or a last leave message, then the RBridge sends a notification message to each RBridge in the TRILL network (operation 818). Otherwise, the RBridge does not send any notification to other RBridges to reduce the number of IGMP messages in the TRILL network. In some embodiments, the notification message is a VCS notification message.

If the packet is received on a TRILL port (operation 806), then the RBridge checks whether the packet is a notification from a partner RBridge (operation 820). If so, the RBridge updates records in the local IGMP database based on the partner RBridge information (operation 822). For example, in FIG. 7, as end device 722 is multi-homed, it is coupled to partner RBridges 701 and 702 via respective edge ports. If the control message is received at RBridge 701, the partner RBridge 702 is notified. Then RBridge 702 adds the local edge port that couples end device 722 to the local multicast database. However, as the primary link for end device 722 is from RBridge 701, partner RBridge 702 does not forward the multicast packets; they are forwarded by RBridge 701. If the message is not a notification from a partner RBridge, the RBridge updates records in the remote multicast database for the multicast group and VLAN pair (operation 824).

Figure 8B:
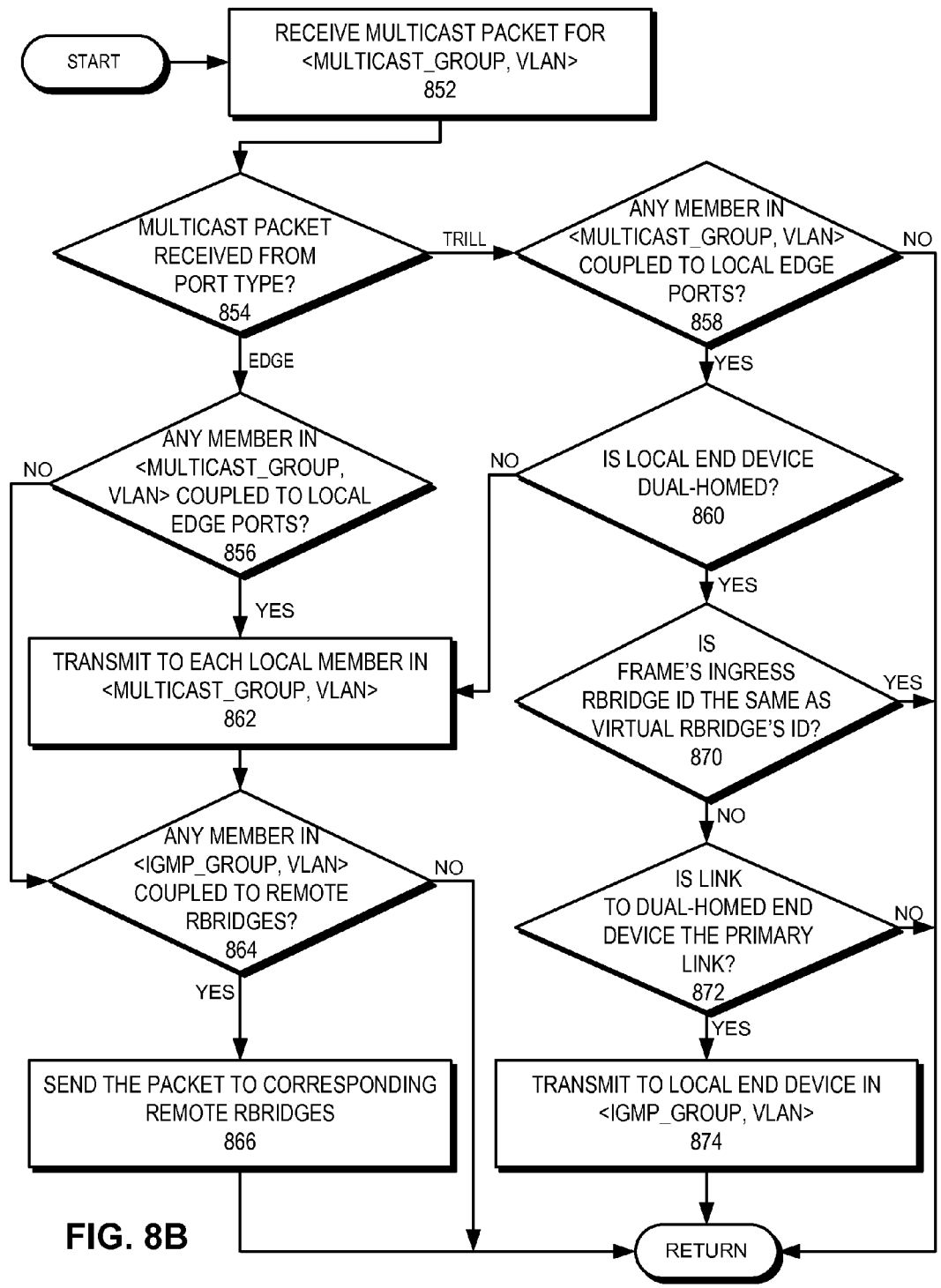
FIG. 8B presents a flowchart illustrating the process of an RBridge forwarding a multicast packet in a TRILL network with virtual link aggregation support, in accordance with an embodiment of the present invention.

FIG. 8B presents a flowchart illustrating the process of an RBridge forwarding a multicast packet in a TRILL network with virtual link aggregation support, in accordance with an embodiment of the present invention. Upon receiving a multicast packet in a VLAN for a multicast group (operation 852), the RBridge determines the port type from which the frame was received (operation 854). If the frame is received from an edge port, the RBridge further determines whether any local end device belonging to the VLAN is has membership to the multicast group (operation 856). If so, the RBridge then transmits the packet to each local end station that belongs to the VLAN and has membership to the multicast group (operation 862). The RBridge then checks whether any remote end device belonging to the VLAN has a membership in the multicast group (operation 864). If there is such an end device, the RBridge sends the packet to each RBridge the TRILL network which has at least one such remote end device coupled to it (operation 866).

If the packet is received from a TRILL port (operation 854), the RBridge then determines whether any local end device belonging to the VLAN is in the multicast group (operation 858). If so, the RBridge further determines whether the local end device is dual-homed (operation 860). If not, the RBridge transmits the payload to each local end station that belongs to the VLAN and is in the multicast group (operation 862). If the end device is dual-homed, the RBridge then determines whether the frame's ingress RBridge identifier is the same as the identifier to virtual RBridge associated with the dual-homed end station (operation 870). If they are the same, the frame is discarded. Otherwise, the RBridge further determines whether its link to the dual-homed end station is the primary link (operation 872). If the link is the primary link, the RBridge forwards the frame to the dual-homed end station via the link (operation 874). Otherwise, the frame is discarded.

Exemplary Switch System

Figure 9:
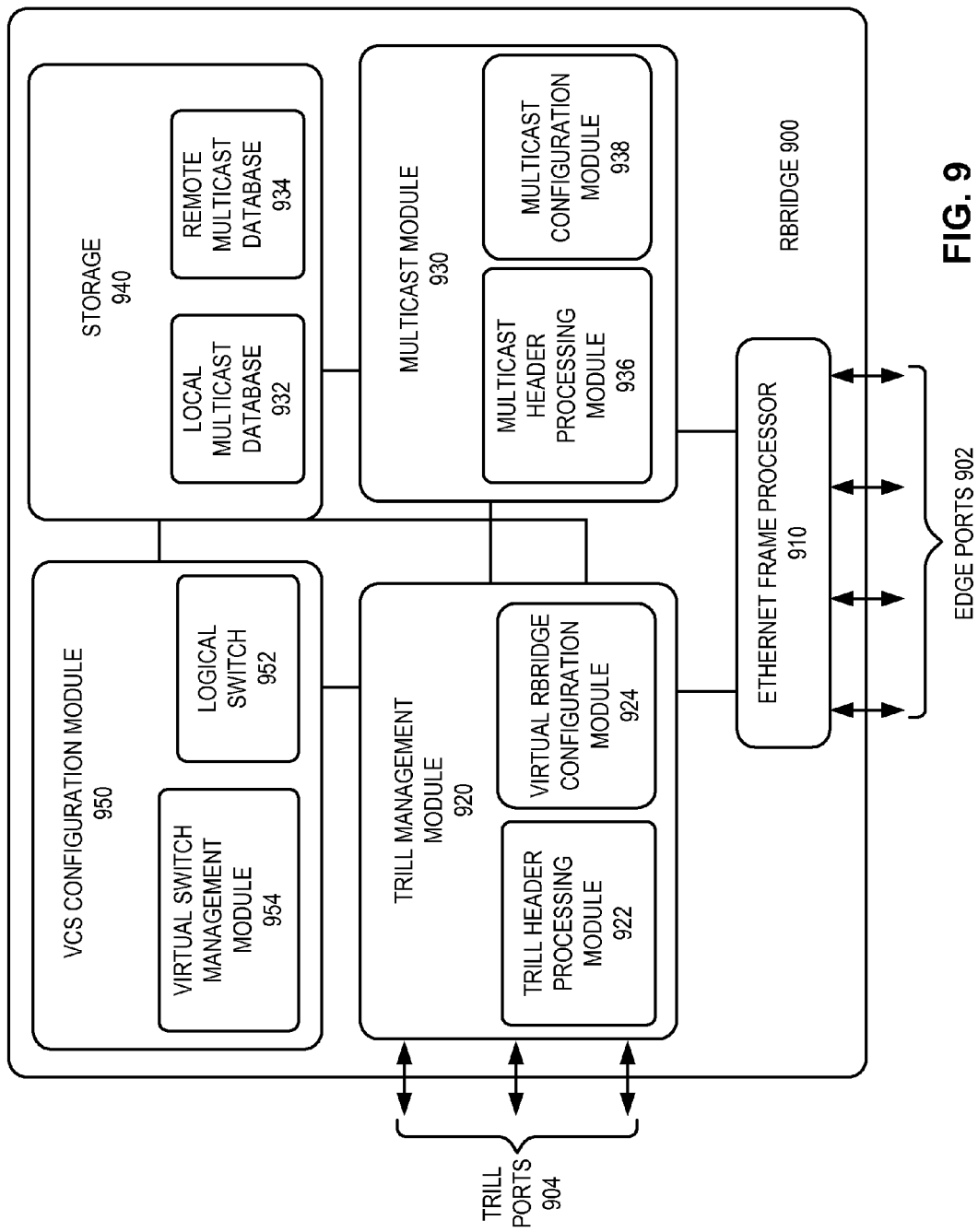
FIG. 9 illustrates an exemplary architecture of a switch capable of learning multicast group membership information from remote switches and accordingly forwarding multicast packets, in accordance with an embodiment of the present invention.

FIG. 9 illustrates an exemplary architecture of a switch capable of learning multicast group membership information from remote switches and accordingly forwarding multicast packets, in accordance with an embodiment of the present invention. In this example, an RBridge 900 includes a number of TRILL ports 904, a TRILL management module 920, a multicast module 930, an Ethernet frame processor 910, and a storage 940. TRILL management module 920 further includes a TRILL header processing module 922. Multicast module 930 further includes an multicast header processing module 936 and an multicast configuration module 938.

TRILL ports 904 include inter-switch communication channels for communication with one or more RBridges. This inter-switch communication channel can be implemented via a regular communication port and based on any open or proprietary format. Furthermore, the inter-switch communication between RBridges is not required to be direct port-to-port communication.

During operation, TRILL ports 904 receive TRILL frames from (and transmit frames to) other RBridges. TRILL header processing module 922 processes TRILL header information of the received frames and performs routing on the received frames based on their TRILL headers. TRILL management module 920 forwards frames in the TRILL network toward other RBridges and frames destined to a layer-3 node toward the multicast module 930. Multicast header processing module 936 determines whether the frame contains a multicast packet. Multicast configuration module 938 processes the content of the multicast control message and updates the remote multicast database 934 residing in storage 940. Storage 940 can also include TRILL and IP routing information.

In some embodiments, RBridge 900 may form a virtual RBridge, wherein TRILL management module 920 further includes a virtual RBridge configuration module 924. TRILL header processing module 922 generates the TRILL header and outer Ethernet header for ingress frames corresponding to the virtual RBridge. Virtual RBridge configuration module 924 manages the communication with RBridges associated with a virtual RBridge and handles various inter-switch communications, such as link and node failure notifications. Virtual RBridge configuration module 924 allows a user to configure and assign the identifier for the virtual RBridges.

In some embodiments, RBridge 900 may include a number of edge ports 902, as described in conjunction with FIG. 1. Edge ports 902 receive frames from (and transmit frames to) end devices. Ethernet frame processor 910 extracts and processes header information from the received frames. Ethernet frame processor 910 forwards the frames to TRILL management module 920 and multicast module 930. If multicast header processing module 936 determines that a frame contains a multicast control message, IGMP configuration module 938 processes the content of the message and updates the local multicast database 932 residing in storage 940.

In some embodiments, RBridge 900 may include a VCS configuration module 950 that includes a virtual switch management module 954 and a logical switch 952, as described in conjunction with FIG. 1. VCS configuration module 950 maintains a configuration database in storage 940 that maintains the configuration state of every switch within the VCS. Virtual switch management module 954 maintains the state of logical switch 952, which is used to join other VCS switches. In some embodiments, logical switch 952 can be configured to operate in conjunction with Ethernet frame processor 910 as a logical Ethernet switch.

Note that the above-mentioned modules can be implemented in hardware as well as in software. In one embodiment, these modules can be embodied in computer-executable instructions stored in a memory which is coupled to one or more processors in RBridge 900. When executed, these instructions cause the processor(s) to perform the aforementioned functions.

In summary, embodiments of the present invention provide a switch, a method, and a system for learning and sharing multicast group information from remote RBridges in a TRILL network. In one embodiment, the switch includes a storage and a multicast management mechanism. The storage is configured to store an entry indicating a multicast group membership learned at a remote switch. The multicast management mechanism is coupled to the storage and is configured to suppress flooding of packets destined for the multicast group.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
one or more ports;
a storage configured to store a first multicast database, wherein a respective entry in the first multicast database includes membership information of a multicast group learned at a remote switch, and wherein the entry is associated with an identifier of the remote switch; and
a multicast management module configured to suppress flooding via the one or more ports a packet destined for a multicast group in response to identifying the membership information of the multicast group in an entry in the first multicast database;
wherein the switch and the remote switch are member switches of a network of interconnected switches, and wherein a media access control (MAC) address learned via one of the one or more ports is shared with the remote switch.

2. The switch of claim 1, wherein a respective entry in the first multicast database includes a virtual local area network (VLAN) identifier.

3. The switch of claim 1, wherein an entry in the first multicast database is a non-flooding forwarding entry corresponding to the multicast group and the remote switch.

4. The switch of claim 1, wherein the switch and the remote switch participate in a link aggregation, and wherein at least one of the one or more ports participates in the link aggregation; and
wherein the membership information of the multicast group learned at the remote switch is treated as membership information of a multicast group learned locally at the switch.

5. The switch of claim 1, further comprising a communication module configured to construct a notification message for the remote switch, wherein the notification message comprises membership information of a multicast group learned locally at the switch.

6. The switch of claim 1, wherein the multicast group is formed based on one or more of the following:
Internet Group Management Protocol (IGMP) version 1;
IGMP version 2;
IGMP version 3;
Multicast Listener Discovery (MLD) version 1; and
MLD version 2.

7. The switch of claim 1, wherein the multicast management module is configured to perform Internet Group Management Protocol (IGMP) or Multicast Listener Discovery (MLD) snooping.

8. The switch of claim 1, further comprising a communication module configured to construct a notification message for the remote switch in response to receiving a first join message or a last leave message of the multicast group from a locally coupled end device, wherein the notification message comprises state information of the multicast group.

9. A method, comprising:
   storing a first multicast database in a storage in a switch, wherein a respective entry in the first multicast database includes membership information of a multicast group learned at a remote switch, wherein the entry is associated with an identifier of the remote switch, and wherein the switch includes one or more ports; and
   suppressing flooding via the one or more ports a packet destined for a multicast group in response to identifying the membership information of the multicast group in an entry in the first multicast database;
   wherein the switch and the remote switch are member switches of a network of interconnected switches, and wherein a media access control (MAC) address learned via one of the one or more ports is shared with the remote switch.

10. The method of claim 9, wherein a respective entry in the first multicast database includes a virtual local area network (VLAN) identifier.

11. The method of claim 9, wherein an entry in the first multicast database is a non-flooding forwarding entry corresponding to the multicast group and the remote switch in a data structure.

12. The method of claim 9, further comprising aggregating links coupled to the switch and the remote switch, wherein at least one of the one or more ports participates in aggregating the links; and
   treating the membership information of the multicast group learned at the remote switch as membership information of a multicast group learned locally at the switch.

13. The method of claim 9, further comprising constructing a notification message for the remote switch, wherein the notification message comprises membership information of a multicast group learned locally at the switch.

14. The method of claim 9, wherein the multicast group is formed based on one of more of the following:
   Internet Group Management Protocol (IGMP) version 1;
   IGMP version 2;
   IGMP version 3;
   Multicast Listener Discovery (MLD) version 1; and
   MLD version 2.

15. The method of claim 9, wherein the method further comprises performing Internet Group Management Protocol (IGMP) or Multicast Listener Discovery (MLD) snooping.

16. The method of claim 9, further comprising constructing a notification message for the remote switch in response to receiving a first join message or a last leave message of the multicast group from a locally coupled end device, wherein the notification message comprises state information associated with the multicast group.

17. A switching system, comprising a first switch and a second switch;
   wherein the first switch comprises:
      one or more ports;
      a storage configured to store a first multicast database, wherein a respective entry in the first multicast database includes membership information of a multicast group learned at the second switch, and wherein the entry is associated with an identifier of the second switch; and
      a multicast management module configured to suppress flooding via the one or more ports a packet destined for a multicast group in response to identifying the membership information of the multicast group in an entry in the first multicast database;
   wherein the switching system is a network of interconnected switches, and wherein a media access control (MAC) address learned via one of the one or more ports is shared with the second switch.

18. The switching system of claim 17, wherein a respective entry in the first multicast database includes a virtual local area network (VLAN) identifier.

19. The switching system of claim 17, wherein an entry in the first multicast database is a non-flooding forwarding entry corresponding to the multicast group and the second switch.

20. The switching system of claim 17, wherein the first switch and the second switch participate in a link aggregation, and wherein at least one of the one or more ports participates in aggregating the links; and
   wherein the membership information of the multicast group learned at the second switch is treated by the first switch as membership information of a multicast group learned locally at the first switch.

21. The switching system of claim 17, wherein the first switch further comprises a communication module configured to construct a notification message for the second switch, wherein the notification message comprises membership information of a multicast group learned locally at the first switch.

22. The switching system of claim 17, wherein the multicast group is formed based on one or more of the following:
   Internet Group Management Protocol (IGMP) version 1;
   IGMP version 2;
   IGMP version 3;
   Multicast Listener Discovery (MLD) version 1; and
   MLD version 2.

23. The switching system of claim 17, wherein the multicast management module is configured to perform Internet Group Management Protocol (IGMP) or Multicast Listener Discovery (MLD) snooping.

24. The switching system of claim 17, wherein the first switch further comprises a communication module configured to construct a notification message for the second switch in response to receiving a first join message or a last leave message of the multicast group from an end device coupled to the first switch, wherein the notification message comprises state information associated with the multicast group.

* * * * *